UNITED STATES PATENT OFFICE.

JOHN JOSEPH FOX, OF FLUSHING, NEW YORK.

PROCESS OF TRANSFERRING PRINTS, &c.

SPECIFICATION forming part of Letters Patent No. 406,519, dated July 9, 1889.

Application filed September 1, 1888. Serial No. 284,366. (No specimens.)

*To all whom it may concern:*

Be it known that I, JOHN JOSEPH FOX, of Flushing, in the county of Queens and State of New York, have invented certain new and useful Improvements in the Process of Transferring Prints to Enameled Oil-Painted Surfaces; and I do hereby declare the following to be a full, clear, and exact description of the invention, such as will enable others skilled in the art to which it appertains to make and use the same.

My invention relates to the process of transferring a print of any description having a face sufficiently smooth to effect adhesion to an enameled oil-painted surface, and is as follows: The enameled oil-painted surface (such as enameled oil-cloth) is first rubbed well with soap and water. The soap is next thoroughly washed off and the surface well dried. I next apply turpentine to the surface and rub it on vigorously till all that has been applied has evaporated. Then applications of both soap and turpentine should be repeated, if necessary, till a dull surface takes the place of the highly-glossed surface, when it is in a condition to receive the print. This preparation, however, of the enameled oil-painted surface is not absolutely necessary, as all prints can be made to adhere to the enameled oil-painted surface by first rubbing it well with aqua-ammonia; but as this application is apt to cause discoloration of the oil-painted surface, I prefer to prepare the cloth as above directed. An auxiliary liquid is used to aid in the transferring process of any kind of a print, in colors or otherwise, composed of any one of the following solutions: aqua-ammonia, alcohol, tincture of camphor—nine parts alcohol, one part sweet-oil; nine parts alcohol, one part turpentine; nineteen parts alcohol, one part muriatic acid; two parts aqua-ammonia, two parts alcohol, one part tincture of camphor. I prefer, however, in all cases to use nine parts of alcohol to one part of a saturated alcoholic solution of camphor.

The following method is employed to effect an adhesion of all kinds of prints to the enameled oil-painted surface: Pour a sufficient quantity of the above-mentioned camphorated solution of alcohol on that part of the enameled oil-painted surface to which the transfer is to be made as will not only thoroughly saturate the face of the print, but will keep the body of the paper on which it is printed in a sufficiently moist state till the adhesion of the print to the enameled oil-painted surface is effected. The print to be transferred is next laid on this moistened surface face down. Direct pressure should then be applied in a lesser or greater degree, as the print demands. Following direct pressure friction alone or frictional heat is to be applied; also, direct pressure in combination with heat or friction and frictional heat.

In the transferring of small recent prints, where the camphorated alcoholic solution acts as a dissolvent on the ink, the following is the method of transferring it to the enameled oil-painted surface: Having applied the print to the moistened oil-painted surface as directed, it should be vigorously patted down with a clean wad of cotton cloth, or just sufficient pressure to effect the adhesion. Much friction should never be applied in this stage while the print is very moist, as it may blur the face of the transferred print. After it is partially dry friction should be vigorously applied with the smooth rounded face of some instrument, like the face of the rim on the handle of a pair of scissors, and continued until after it appears to be perfectly dry. The next step is to remoisten the back of the print, as it adheres to the enameled oil-painted surface, with the camphorated alcoholic solution sufficiently to bring into view all the details of the print during this stage of its transfer. While in this moistened state the details of the print are to be carefully followed and friction applied as above directed. This being accomplished, the entire print is to be again well moistened with the camphorated alcoholic solution and gentle friction again applied over the entire surface. If, however, the print is very dark and evidently loaded with ink, little or no friction should be employed in this stage, as it may blur the face of the transferred print. Here direct pressure should be employed for a moment or so. The next step is to lift the corner of the paper with the thin blade of a knife and strip it off, leaving a transfer of the print on the enameled oil-painted surface. If any of the details of the print has failed to adhere to the enameled oil-painted surface, it can be noticed when the paper is being stripped off, when it should be laid back and gentle friction applied over that spot. If this is repeated a number of times, the entire print should again be remoistened before it is entirely stripped off. If any particles of paper adhere, the print should first be allowed to become perfectly dry, when with a slight moisture on the end of the finger they may be rubbed up without injury to the transferred print.

In addition to the above method, frictional heat with the smooth rounded face of some instrument, like the face of the rim on the handle of a pair of scissors, gently heated over the chimney of a lamp, should be employed in all cases where the prints are very old; also in all prints where the paper is highly glazed or the sizing on the paper in any way interferes with the transfer; also in all prints in lithographic colors or prints of any description in colors or combination of colors and gilding.

When a large print is to be transferred, it should be made to adhere to the enameled oil-painted surface, as directed. The back of the print should then be marked off in square inches, following which each square inch should be remoistened and friction applied. A special mark should be employed where the ink is heavily deposited, care being taken not to employ too much moisture or friction on that particular spot. Every square inch should be gone over in this manner carefully, and no details of the print will be lost. The entire paper should then be remoistened and stripped, as above described. When a large print is old or highly glazed in lithographic ink or in any of the various colors, frictional heat should be applied to any square inch, as above directed, after which the entire surface should be remoistened and the paper stripped and rubbed off.

After heat has been employed to aid in the transfer of any print in any kind of ink or in colors it will be found that the paper on which the print is printed will have to be stripped off in pieces, after which all remaining parts will have to be rubbed off with the end of the finger. These particles will not be rubbed off, however, till the transferred print has thoroughly dried.

All colored prints, having been first made to adhere, are to be stripped as directed, with the exception that the body of the paper on which they are printed is to be first soaked in a solution of glycerine, one part, and water, four parts, and then stripped as directed. When all the paper, however, has been removed, the face of the transferred print will still be found covered with a sort of a paste. This is to be further soaked in the water and glycerine, following which it can be easily wiped off with a piece of cotton cloth.

When colors have been applied to any print following its transfer, they may be erased, if water-colors, by the application of water and slight friction applied with a clean piece of cotton cloth. If aniline colors, they may also be removed in a like manner, either with or without the addition of turpentine or dilute aqua-ammonia, one part to nine parts, leaving the print intact. When it is necessary to remove oil-paint, turpentine should be applied, also aqua-ammonia. This will necessitate the removal of the print with the oil-colors.

When a print is to be transferred to a gelatine surface, the latter should first be well moistened with water, then rubbed off apparently dry. Sweet-oil is then rubbed on and the print laid on this moistened spot. Slight friction and pressure are applied, and the print is then stripped off. After it is well dried, colors either dry or moist can be applied. To erase the print, remoisten the gelatine and it can be at once wiped off. Most any kind of oil can be used as well as sweet-oil; also, alcohol is fully as good. I prefer sweet-oil, however. The print is to be finally finished by an application of varnish.

Having fully described my process, what I claim as new, and desire to secure by Letters Patent, is—

1. The process of transferring a print of any description to an enameled oil-painted surface by preparing the surface by, first, rubbing the enameled surface with soap and water; second, applying turpentine thereto; third, applying nine parts of alcohol to one part of saturated alcoholic solution of camphor, substantially as described.

2. The process of transferring a print of any description to an enameled oil-painted surface by, first, rubbing the surface with soap and water; second, applying turpentine thereto; third, applying nine parts of alcohol to one part of saturated alcoholic solution of camphor, placing the print to be copied on the moistened surface, the application of direct pressure thereto, then the application of heated frictional pressure, substantially as described.

In testimony whereof I have signed this specification in the presence of two subscribing witnesses.

JOHN JOSEPH FOX.

Witnesses:
J. W. GILL,
H. F. STAHMER.